United States Patent
Finke, deceased et al.

[11] 3,708,377
[45] Jan. 2, 1973

[54] MACHINE FOR MANUFACTURING HEAT-SEALED BAGS

[75] Inventors: Arno Finke, deceased, late of 454 Lengerich, Germany by Adele Finke, executrix; Frank Bosse, 453 Ibbenburen-Dorenthe, Germany

[73] Assignee: Maschinenfabrik Windmoeller & Holscher, Lengerich in Westfalen, Germany

[22] Filed: May 18, 1970

[21] Appl. No.: 38,002

[30] Foreign Application Priority Data

May 17, 1969 Germany.............P 19 25 249.4

[52] U.S. Cl. ...............156/582, 156/380, 156/583
[51] Int. Cl. ...........................................B32h 31/20
[58] Field of Search.................156/582, 583, 380

[56] References Cited

UNITED STATES PATENTS

| | | | |
|---|---|---|---|
| 2,693,221 | 11/1954 | Lyijynen | 156/582 X |
| 3,360,416 | 12/1967 | Cochrane | 156/583 X |
| 2,904,100 | 9/1959 | Fener | 156/583 |
| 3,549,462 | 12/1970 | Hollis | 156/583 |
| 2,627,893 | 2/1953 | Williams | 156/582 |

*Primary Examiner*—Benjamin A. Borchelt
*Assistant Examiner*—H. J. Tudor
*Attorney*—George H. Spencer, Harvey Kaye and Jay M. Finkelstein

[57] ABSTRACT

In a machine for mass-producing heat-sealed bags from continuous panels of heat-sealable material, a welding cylinder carrying a plurality of transverse welding ledges for forming weld seams transverse to the length of such panels, the cylinder carrying a plurality of fasteners for permitting the ledges to be mounted at different points along the circumference of the cylinder so that the spacing between adjacent ledges can be varied for the production of bags having different widths.

11 Claims, 17 Drawing Figures

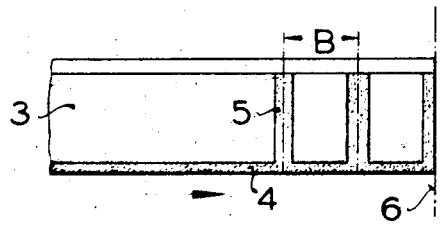
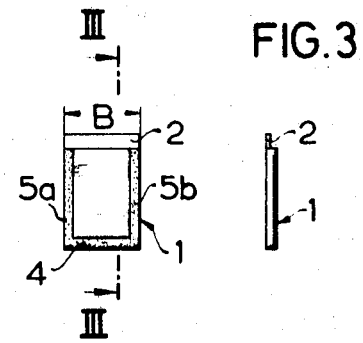
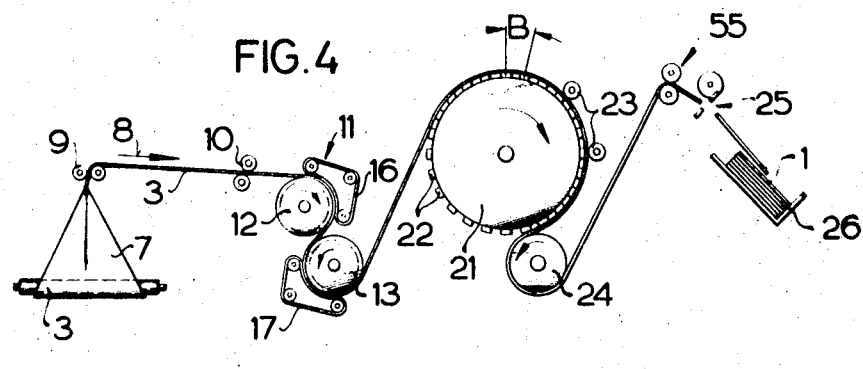
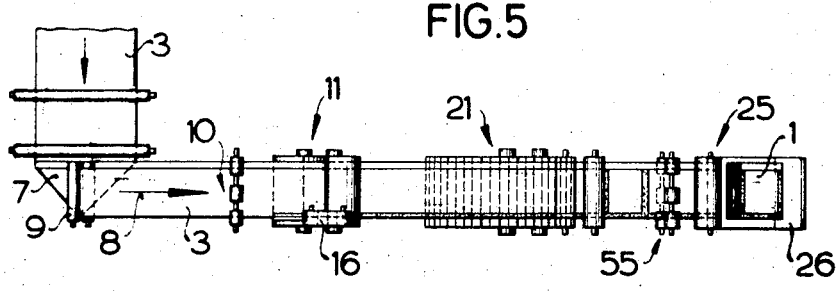

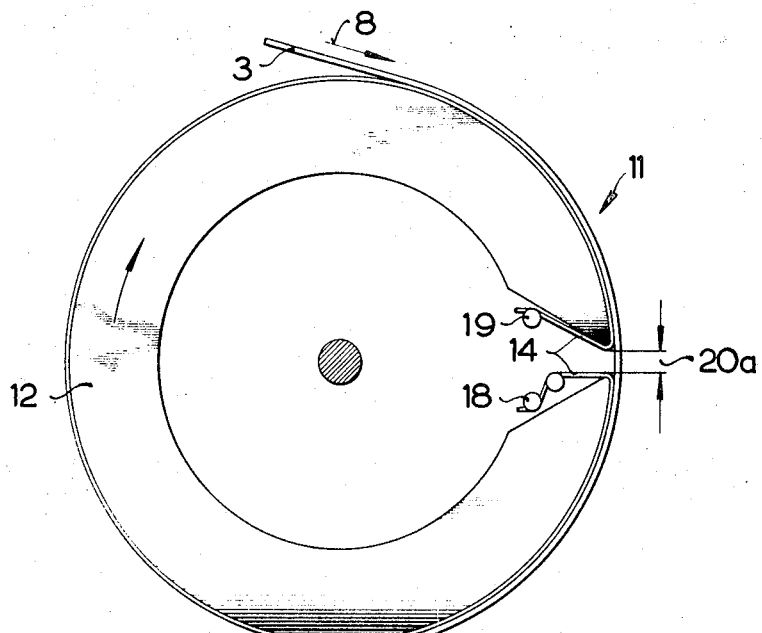
FIG.6
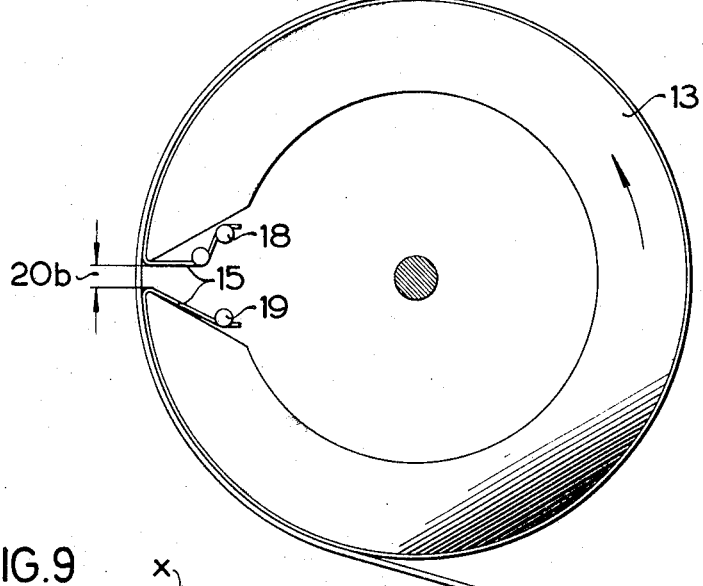
FIG.9
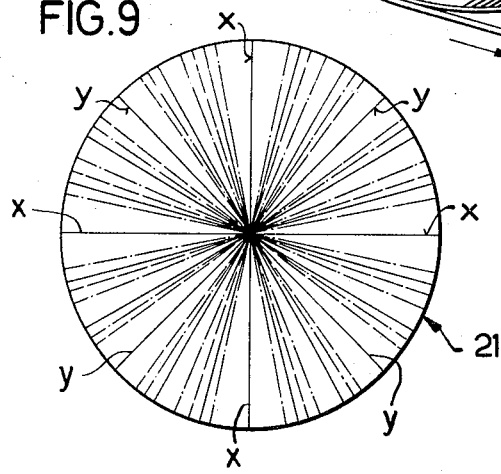
INVENTORS.
Arno Finke, deceased.
By Adele Finke, Heiress
of the estate.
Frank Bosse
by *Spencer & Kaye*
their ATTORNEYS

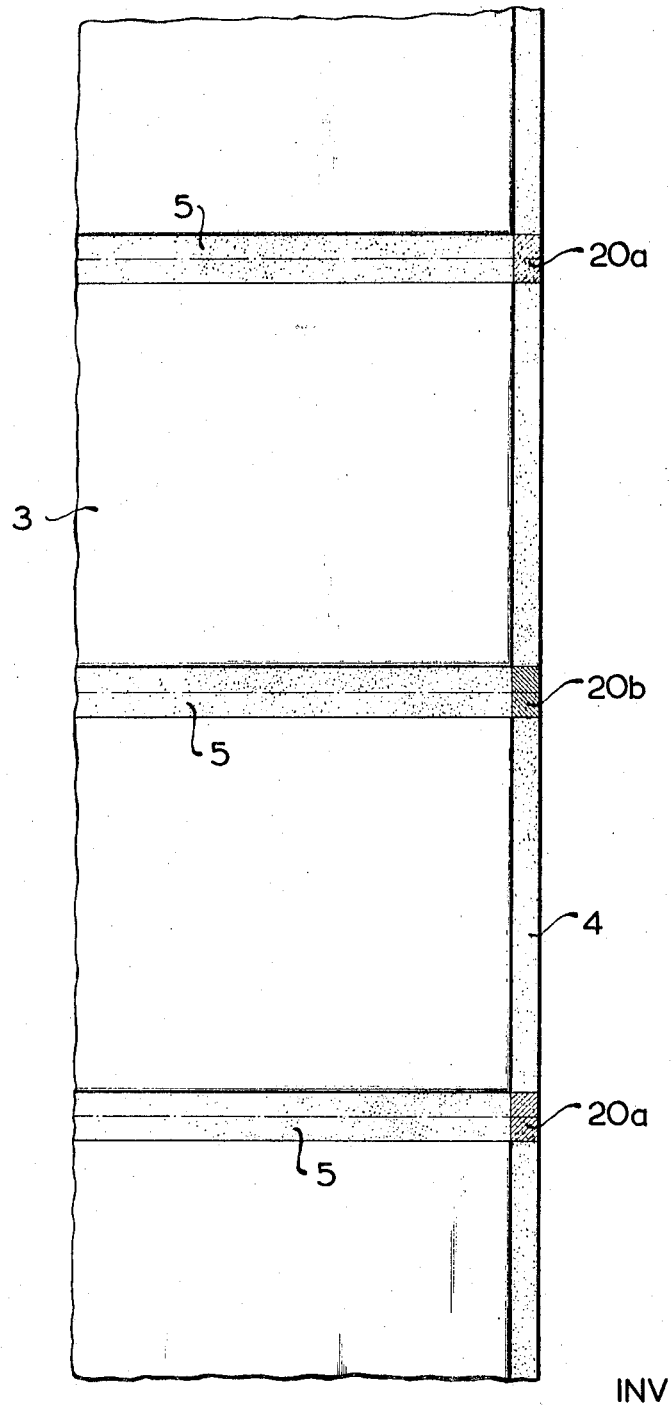

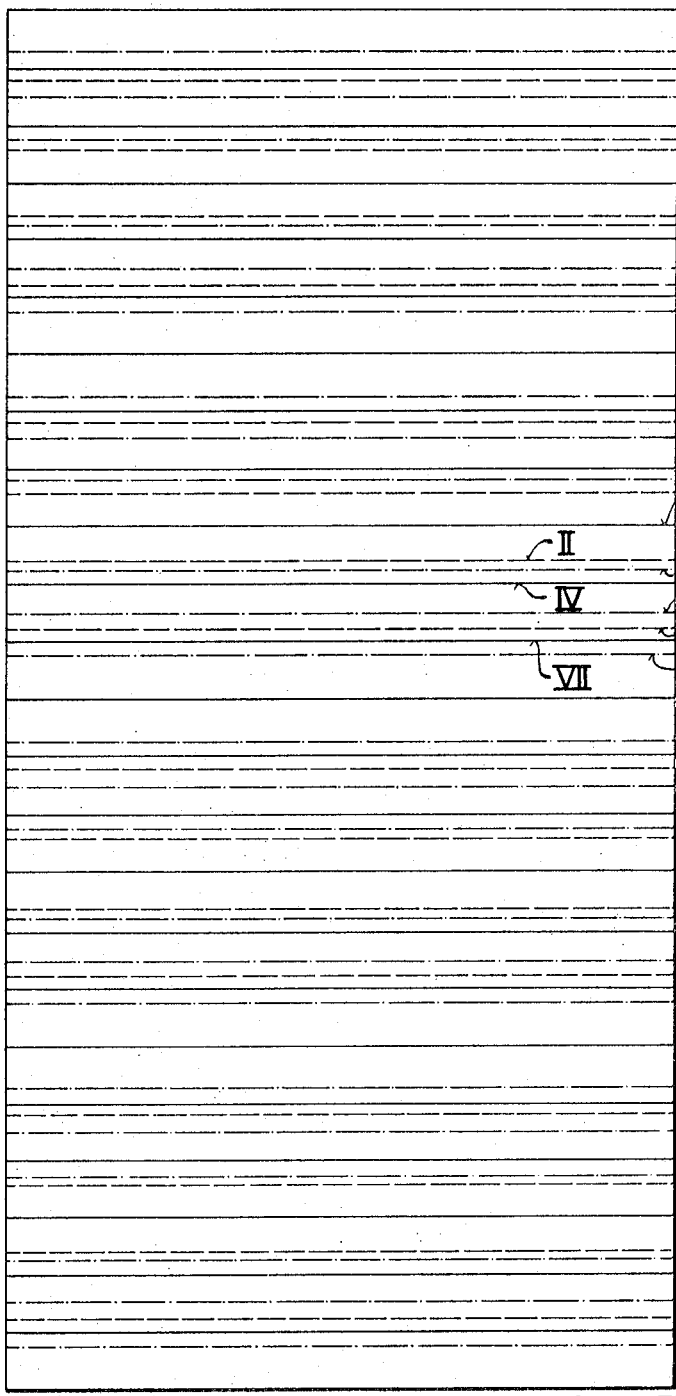

INVENTORS.
Arno Finke, deceased.
By Adele Finke, Heiress
of the estate
Frank Bosse by *Spencer & Kaye*
their ATTORNEYS

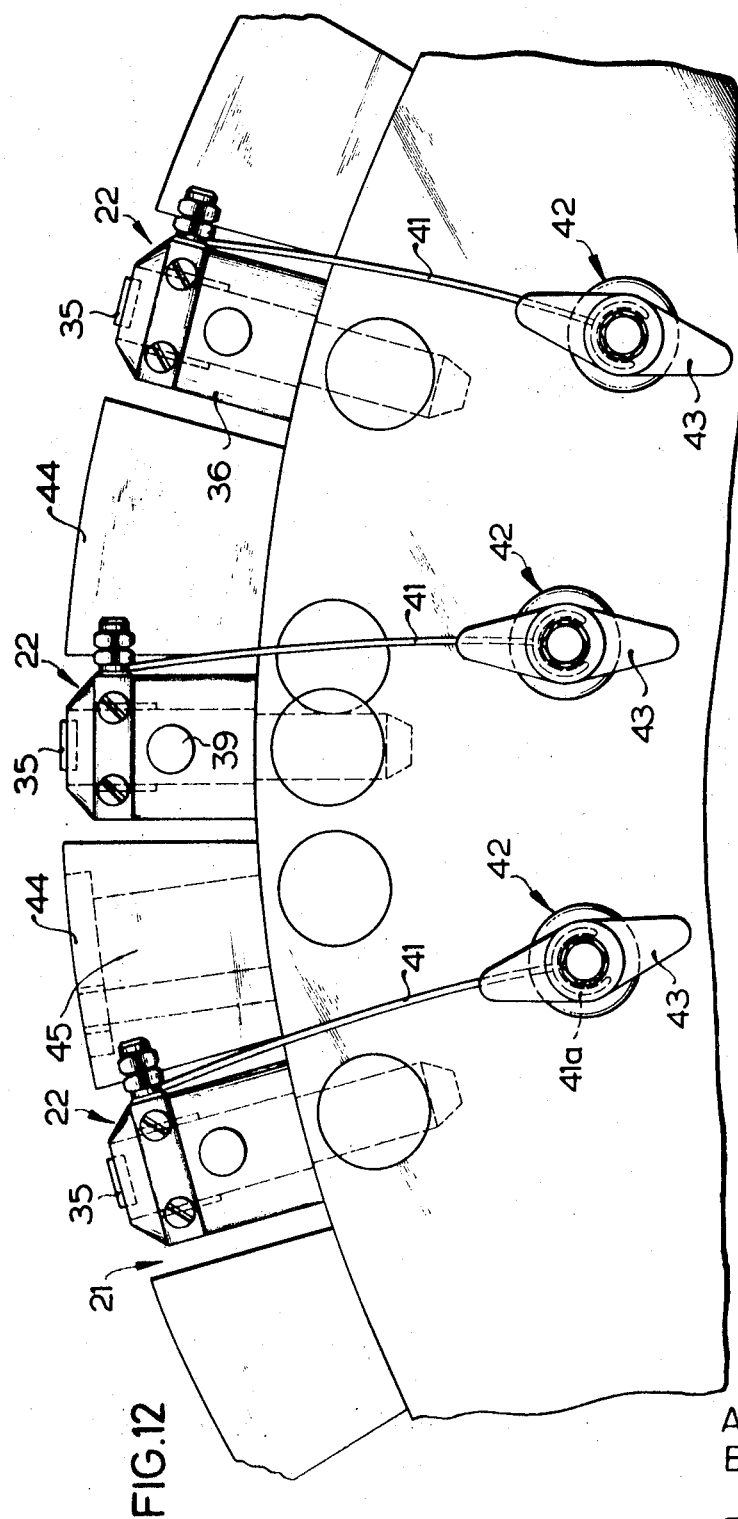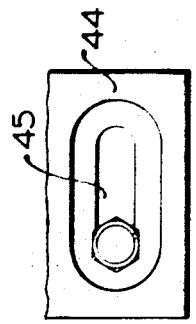

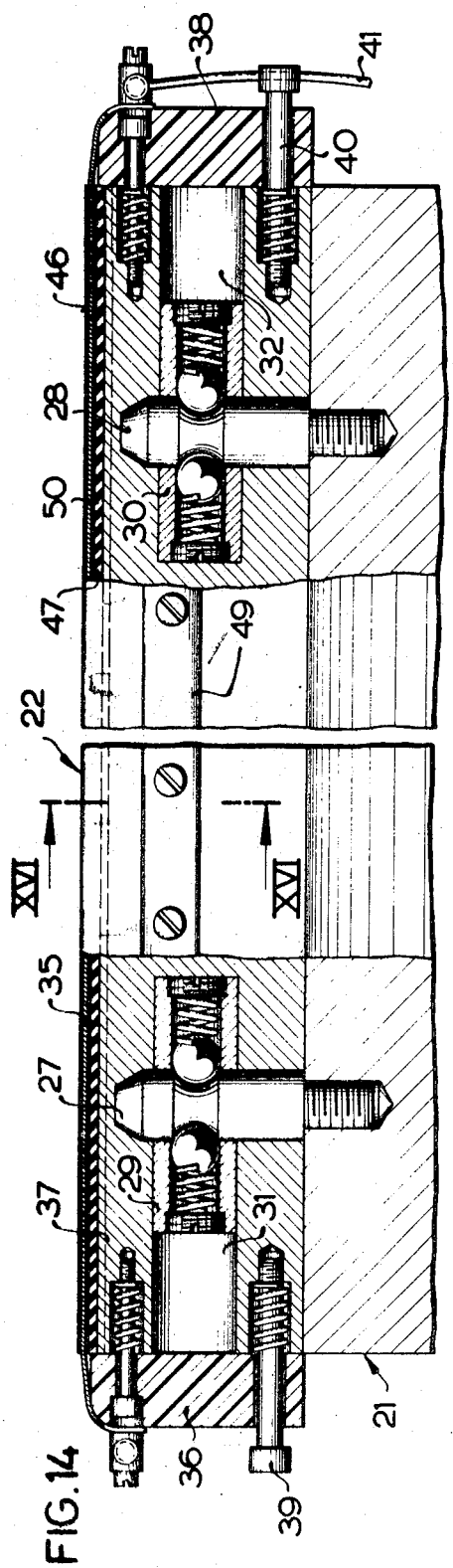
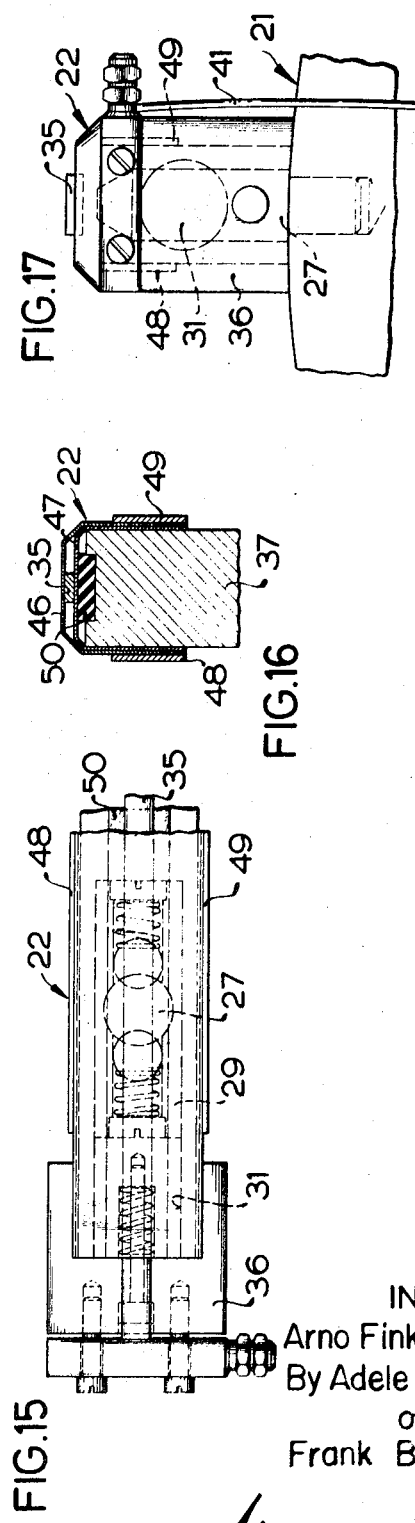
INVENTORS.
Arno Finke, deceased.
By Adele Finke, Heiress
of the estate
Frank Bosse
by *Spencer & Kaye*
their ATTORNEYS

MACHINE FOR MANUFACTURING HEAT-SEALED BAGS

BACKGROUND OF THE INVENTION

The present invention relates to a machine for manufacturing heat-sealed flat bags of uninterrupted continuous panels of heat-sealable material, plastic foil material, plastic foil laminations, or paper or metal foil panels provided with a coating of a plastic material.

It is known to manufacture such bags by folding a sheet of material over and applying transverse seams to the panels by means of a plurality of transverse welding ledges which repeatedly contact the panel material at intervals depending on the width of the bags to be produced in the direction of movement of the panel or panels so as to weld the panel material over a region which is twice the width of each desired lateral edge seam of each bag. The welded panel material is then separated along the center of each of these transverse weld regions, and the individual bags are laid aside or transported away. The transverse ledges are disposed on the periphery of a rotating transverse welding cylinder around which the folded or double panel of the material is partially guided during manufacture.

SUMMARY OF THE INVENTION

It is the object of the present invention to provide a fast-acting machine for the manufacture of heat-sealed flat bags which can easily be adapted to a multitude of different bag widths.

A further object of the invention is to improve the quality of the finished welds while increasing the speed at which the panels to be processed move through the machine.

These and other objects according to the invention are accomplished, in a machine of the above-mentioned type, by providing the transverse welding cylinder with a plurality of clamping or plug-in fasteners for an interchangeable fastening of the transverse welding ledges at variable mutual spacings and at appropriate locations along the cylinder circumference.

The use of such transverse welding cylinders offers, as will be shown below, substantial advantages with respect to the extremely wide range of bag formats which can be produced with such transverse welding cylinders.

Two clamping or plug-in fasteners disposed at identical intervals and parallel to the axis of the transverse welding cylinder in the vicinity of the two cylinder or ledge ends are basically sufficient for the fault-free fastening of each transverse welding ledge to the transverse welding cylinder. These clamping or plug-in fasteners may then be arranged in two parallel rows around the periphery of the transverse welding cylinder. If it is intended to provide such a cylinder with a different number of transverse welding ledges, e.g., 20, 24, or 32 ledges, equally distributed around the cylinder circumference, difficulties might arise, however, with respect to the arrangement of the individual clamping or plug-in fasteners in a continuous row. This can be overcome, however, according to a further feature of the present invention, in that when the clamping or plug-in fasteners of different sets either overlap or follow one another too closely, all these fasteners at each transverse ledge and at the transverse welding cylinder are so arranged that the ledges, when rotated about 180°, can be secured with their sides reversed at the clamping or plug-in fasteners of one set provided on the transverse welding cylinder in exact mirror-symmetry to the other asymmetrically disposed set of clamping or plug-in fasteners.

Each clamping or plug-in fastener consists advantageously of a plug-in bolt fastened at the transverse welding ledge or at the transverse welding cylinder transverse to its longitudinal axis and of a double ball latch at the associated other portion, i.e., the transverse welding cylinder or the transverse welding ledge, into which the insertable bolt engages radially to the transverse welding cylinder. The double ball latches are here inserted into axial parallel bores of the frontal walls of the transverse welding cylinder or into axial bores at the ends of the transverse welding ledges and are preferably secured against rotation and falling out by holding pins. Since the plug-in bolts have a smaller diameter than the double ball latches employed, it may be advantageous, in order to prevent difficulties which might arise from overlapping or too close sequence of the clamping or plug-in fasteners, to arrange the plug-in bolts so that they protrude radially outwardly from the transverse welding cylinder and to dispose the double ball latches at the transverse welding ledges. This embodiment is substantially less expensive inasmuch as it saves on the number of double ball latches required and the machining of the transverse welding cylinder is substantially simplified. In this embodiment there also is eliminated the need for an asymmetrical placement and mirror-reversed arrangement of the fastening points at the transverse welding cylinder when the clamping and plug-in connections overlap too much.

The machine according to the present invention comprises a further feature which is characterized by a longitudinal seam welding device, based on a previous proposal of the applicant, which is connected ahead of the transverse welding cylinder and which comprises two oppositely disposed longitudinal welding rollers around which the folded or doubled panel of material is placed in the shape of an S to produce at least one longitudinal seam along its edge.

The association of such a longitudinal welding device comprising rotating welding rollers with the transverse welding cylinder of the present invention offers the advantage that the longitudinal welding can be accomplished without difficulties at the same speed as the transverse welding. Moreover, with a double folded panel of material the longitudinal weld along the side of the fold improves the looks and tightness of the finished bag since cracks which could lead to leaks easily occur in the fold are closed by the longitudinal weld.

In a further development of the present invention, the longitudinal welding rollers may be adapted in their diameter to the diameter of the transverse welding cylinder in such a manner that with the appropriate spacing of the transverse welding ledges one of the transverse weld seams coincides with one of the short welding gaps occuring on alternating sides at regular spacings along the longitudinal weld seam between the overlaps corresponding to the circumference of the longitudinal welding rollers. The diameter of the transverse welding cylinder may here be an integral multiple, such as approximately two, three, or four, of the diameter of the longitudinal welding rollers.

Due to the coincidence of the transverse weld seams with the gaps between the individual longitudinal welds, these gaps, which have already been welded once by the respective other longitudinal weld, are subsequently welded once more so that, finally, there exists a double longitudinal weld at all places, which imparts uniform appearance to the longitudinal weld seam.

BRIEF DESCRIPTION OF THE DRAWINGS

FIG. 1 is a plan view of a double panel of material which is provided with transverse and longitudinal welds by means of a machine according to the present invention.

FIG. 2 shows a plan view of one of the flat sides of a finished flat bag cut from the panel of FIG. 1.

FIG. 3 is a sectional view of such a bag along section lines III—III of FIG. 2.

FIG. 4 is an elevational simplified schematic representation of a machine according to the invention for manufacturing such flat bags.

FIG. 5 is a plan view of the machine shown in FIG. 4.

FIG. 6 is a view to an enlarged scale compared with FIGS. 4 and 5, of the longitudinal welding device of the machine of FIGS. 4 and 5.

FIG. 7 is a plan view showing the mutual association of the longitudinal and transverse weld seams produced by the machine of FIGS. 4 and 5, to a scale which is also enlarged compared with FIGS. 4 and 5.

FIG. 8 is a developed view of a transverse welding cylinder of such a machine illustrating the positions of interchangeable fastening of the transverse weld seams at different spacing along the cylinder periphery.

FIG. 9 shows a circular development of the cylinder of FIG. 8.

FIG. 12 is a detail, axial elevational view to an enlarged scale of the arrangement of a number of transverse welding ledges and the associated cylinder of the machine of FIGS. 4 and 5

FIG. 13 is a detail view of FIG. 12.

FIG. 14 is a cross-sectional view of a modified embodiment of the interchangeable fastening of the welding ledges to the periphery of the transverse welding cylinder of FIGS. 4 and 5.

FIG. 15 is a detail plan view of the left side of the welding ledge fastening of FIG. 14.

FIG. 16 is a cross-sectional view along the section line XVI—XVI of FIG. 14.

FIG. 17 is a frontal elevational view of the welding ledge fastening to the transverse welding cylinder shown in FIGS. 14 and 15.

DESCRIPTION OF THE PREFERRED EMBODIMENTS

Figure 10:
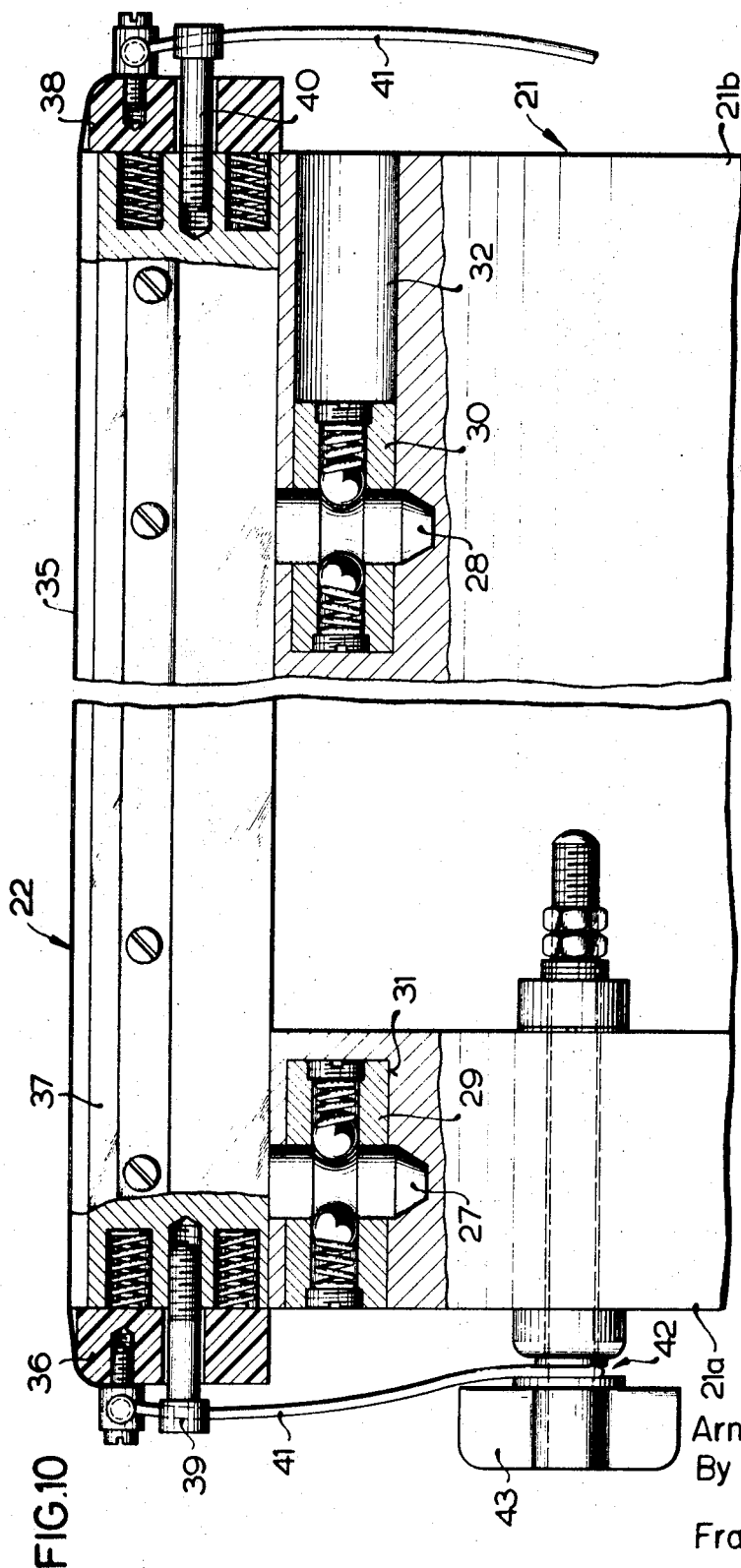
FIG. 10 is a detail view, partly in cross section, showing the arrangement and fastening of a transverse welding ledge to the transverse welding cylinder of the machine of FIGS. 4 and 5 to an enlarged scale with respect to FIGS. 4 and 5.

FIG. 1 of the drawings shows a panel of heat sealable material 3 which is asymmetrically folded over for the manufacture of bags 1 having a bag closing flap 2, as shown in FIGS. 2 and 3. A longitudinal weld seam 4 is provided along the side of the fold in the panel to improve the appearance of the finished bag 1. The seam 4 improves the fluid tightness of the finished bags by preventing the development of cracks which would lead to leaks. The material employed for bag 1 may be panels of a synthetic material, or plastic, or paper or metal foil panels provided with a thermoplastic coating. The individual bags are further formed by double-width transverse weld seams 5 and by separation cuts 6 along the center lines of seams 5 at spaced intervals 6. After separation from the panel 3, therefore, each bag 1 has two oppositely disposed transverse weld seams 5a, 5b and one longitudinal weld seam 4, as well as a closing flap 2 disposed opposite the longitudinal seam.

As can be seen in FIGS. 4 and 5, the asymmetrical folding of the panel 3 is preferably accomplished by passing the initially open panel over a folding triangle 7. Folding triangle 7 can, as shown in FIGS. 4 and 5, be a simple triangular piece having its edges smoothed to avoid cutting or scratching the bag material. The folded panel 3 is then brought between two guide rollers 9 and two conveying rollers 10 in the direction of arrow 8 to a longitudinal seam welding device 11. This longitudinal seam welding device 11 as shown in detail in FIG. 6, consists of two supplementary welding rollers 12 and 13 around which the panel 3 is brought along an S-shaped path. To assure perfect contact with the heating bands 14 and 15, disposed around the two welding rollers 12 and 13, respectively, the panel material is pressed thereagainst by externally disposed endless belts 16, 17 moving over rollers and against the surface of the welding rollers.

Thereafter, the longitudinally welded panel 3 is brought around a transverse welding cylinder 21 having a variable number of transverse welding ledges 22 spaced apart by a distance equal to the desired width B of the bags. The ledges function to produce the desired transverse seams 5 by contact with the panel 3. The panel 3 is pressed, at least at certain points against the surface of the transverse welding cylinder 21 by externally disposed pressure rollers 23, or analogous endless belts, and is then transported around a removal roller 24 by means of a conveying device 55 to a known transverse separator device 25 having a rotating separating knife. Downstream of the separator device 25 the separated bags 1 are stacked in an orderly manner in a suitable collecting device 26.

FIG. 6 shows the longitudinal welding device 11 in detail as composed of two longitudinal welding rollers 12 and 13. It is one characteristic of longitudinal welding rollers that it is impossible to connect electrical current to a completely closed heating band on such rollers. The two ends of the heating band of each roller must be separately connected to a current source by means of their terminals 18 and 19 at the interior of the welding roller. It is therefore impossible to avoid the regular appearance of gaps 20a (FIG. 7) along the longitudinal weld seam, the spacing between succeeding gaps being equal to the circumference of the welding roller. This is the reason why a single longitudinal seam welding roller 12 is not sufficient for producing a continuous longitudinal weld seam 4, so that a second roller 13 must be provided which closes the gaps 20a of the first weld.

To this end, the panel 3 is brought along an S-shaped path around both rollers 12 and 13, and the rollers have their respective gaps 20a and 20b between the ends of the heating bands 14 and 15, respectively, offset relative to one another in such a manner that in the finished longitudinal seam 4 the gaps 20a of the one longitudinal weld fall, preferably midway, between the gaps 20b of the other longitudinal weld.

To produce a double weld in the longitudinal seam 4 even at these points, the transverse weld seams 5 produced by the transverse welding cylinders 21, which will be described in detail below, can be associated with longitudinal welds in such a manner that each of the transverse weld seams produced coincides with one of the gaps 20a or 20b of the longitudinal welds. Depending on the circumference of the longitudinal welding rollers 12 and 13 and of the transverse welding cylinder 21 and depending on the width B which the bags 1 are to have, each gap 20a and 20b may, of course, also coincide with every second, third, fourth, etc. transverse weld seam 5.

As can be seen in detail in FIG. 7, the longitudinal seam 4 consists of the superposed longitudinal welds produced by the upper welding roller 12 and the lower welding roller 13. The regions where a weld is produced only by roller 12 is indicated by hatching inclined upwardly to the left and the regions where a weld is produced only by roller 13 by hatching inclined upwardly to the right. The longitudinal welding rollers 12 and 13 are associated with one another, as can also be seen in FIG. 6, so that the gaps 20a produced by the welding roller 12 along the longitudinal weld seam 4 fall in midway between the gaps 20b produced by the other welding roller 13. The diameter of each longitudinal roller 12 and 13 is so selected that it is contained in an integral submultiple, e.g., one-half, one-third, one-fourth, etc, of the diameter of the transverse welding cylinder 21 . This results in the above-mentioned possibility of having the transverse weld seams 5 coincide with the gaps 20a and 20b of the longitudinal weld seam 4, which gaps are, contrary to the rest of the seam, welded only once so that now the entire longitudinal weld seam 4 is welded twice at every point.

FIG. 7 shows a special case in that the transverse weld seams 5 intersect in the longitudinal weld seam 4 only at the gaps 20a and 20b. Normally, however, further uniformly distributed transverse weld seams can be formed between the illustrated transverse weld seams 5 which cover gaps 20a and 20b.

FIGS. 8 to 17 show the configuration of the transverse welding cylinder 21 according to the present invention in all its essential details. The most important feature is here the fastening of the interchangeable transverse welding ledges 22, with substantially variable spacings, to a single transverse welding cylinder provided with a plurality of fastening points having clamping or plug-in fasteners to adjust to the different desired bag widths. The clamping and plug-in fasteners are arranged in different sets around the cylinder circumference since the transverse welding ledges 22 need be uniformly distributed around the cylinder circumference for each bag width, or format. The illustrated clamping or plug-in fasteners may, of course, also serve to interchangeably fasten the transverse welding ledges to a plurality of transverse welding cylinders of different diameters.

FIG. 8 is a developed representation of a transverse welding cylinder 21 having, for example, a working circumference of 2.4 m which cylinder can be provided, depending on the width which the bags are to have with 20, 32, or 24 transverse welding ledges 22 which are uniformly spaced around the cylinder, resulting in bag widths of 120 mm, 75 mm, and 100 mm, respectively, further multiples of these widths being possible by the elimination of welding ledges. FIG. 8 shows in solid lines the fastening points for the welding ledges for dividing the cylinder into 24 bag widths, in dot-dashed lines for 32 bag widths and dashed lines for 20 bag widths. This is further clarified by the numeral cylinder divisions at the left-hand side of the Figure.

FIG. 9 shows the same divisions in a circular development of the cylinder. Here, as well as with the cylinder divisions shown in the numeral indications on the left side of FIG. 8, it can be clearly seen that with the three different cylinder division arrangements selected, there occur four common fastening points X for all three arrangements and an additional four fastening points Y which are common to only two of the arrangements. Thus, at points X transverse welds are accomplished no matter which one of the three arrangements is employed and these can then be coordinated in the longitudinal weld seam with gaps which were welded only once, thus eliminating any need for changing the longitudinal seam rollers when changing from one of the bag widths to another.

Figure 11:
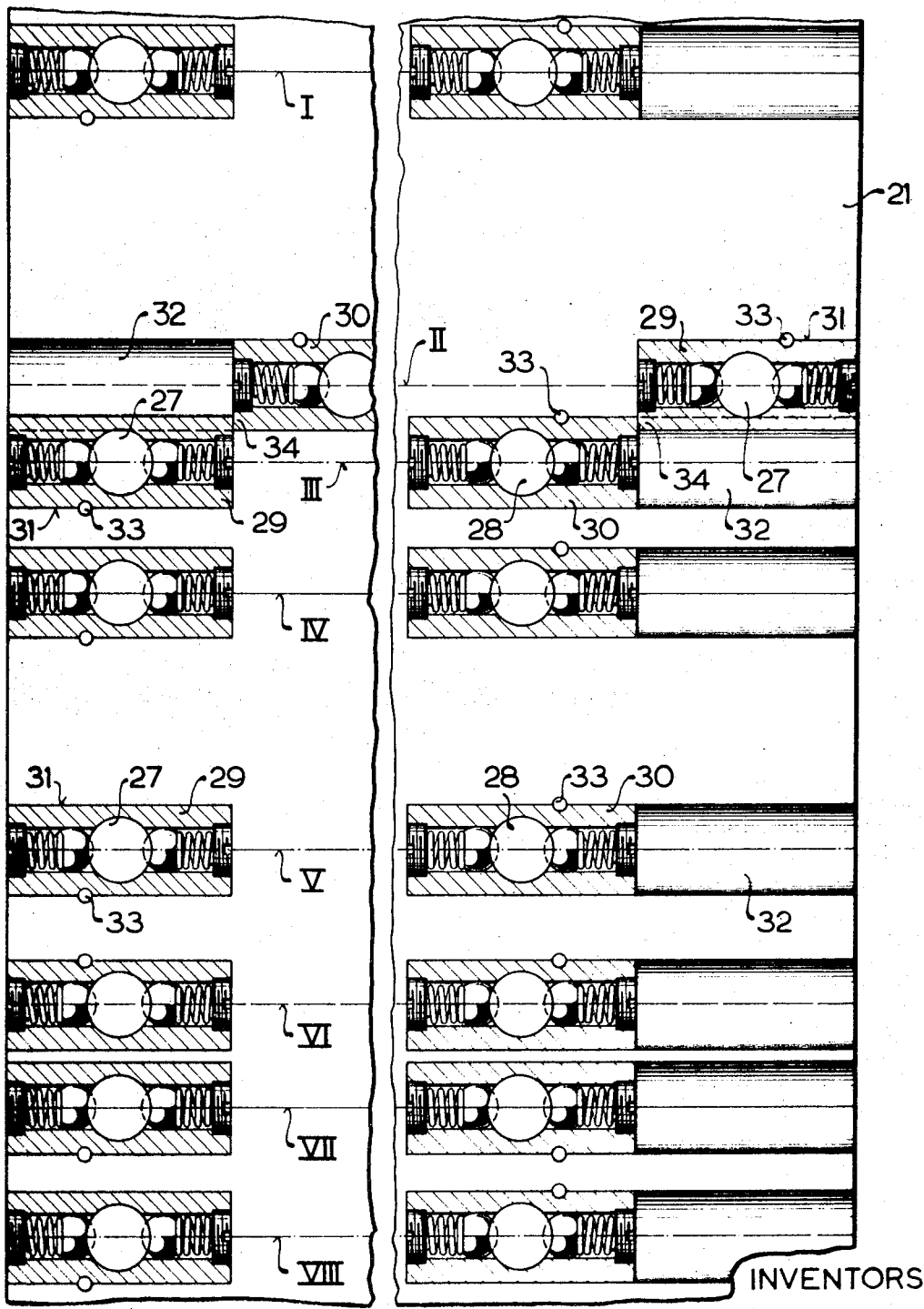
FIG. 11 is a detail view of the development of the transverse welding cylinder shown in FIG. 8 with built-in double ball latches, to an enlarged scale with respect to FIG. 8.

FIGS. 10 to 12 show the interchangeable fastening means for transverse welding ledges 22 in the form of plug-in bolts 27 and 28 which engage in standard-size double ball latches 29 and 30, respectively, disposed at the ends of the transverse welding cylinder 21. The double ball latches 29 and 30 are inserted into axially extending bores 31 and 32, respectively in the two end walls 21a and 21b of the transverse welding cylinder 21 and are secured by pins 33 (FIG. 11) inserted through the cylindrical wall of cylinder 21.

FIG. 11 shows the arrangement of these double ball latches 29 and 30 along a portion of the circumference of the transverse welding cylinder 21, the fastening points I to VIII of FIG. 8 being shown individually to an enlarged scale. The transverse welding cylinder 21 is shown in FIG. 11 as being broken along its central portion so that only its two end portions carrying the double ball latches 29 and 30 are shown.

For the three possible ledge arrangements described earlier, the smallest spacing, which is 15 mm, results between fastening points II and III. It is therefore necessary, since the width of the latches is generally, for structural reasons, greater than 15 mm, to dispose the double ball latches 29 and 30 for fastening point II to be axially offset with respect to the other double ball latches 29 and 30. In order to permit the same transverse welding ledges 22 to be used at all points, including offset point II, the plug-in bolts 27 and 28 are not arranged to be symmetrical with the center of the ledge but—while maintaining the same mutual bolt spacing— are laterally offset in such a manner that they can be selectively plugged either into the double ball latches 29 and 30 disposed in a continuous row around the cylinder circumference at fastening points I and III to VIII or, after rotation about 180°, into the fastening points II which are disposed in mirror-symmetry thereto and are also distributed in a row around the cylinder circumference. The installation of the double bar latches at fastening points II is made possible by this asymmetrical arrangement of the plug-in bolts 28, 27 with respect to the center of the welding ledge and the mirror-symmetrical arrangement with respect to the other double ball latches, even though the bores 31 and 32 serving to hold the double bar latches overlap one another at fastening points II and III. Adjacent double bar latches 29 and 30 abut one another at locations 34.

FIG. 12 shows one end of a portion of the transverse welding cylinder 21 shown in FIGS. 10 and 11 with transverse welding ledges 22 fastened thereto. In order to guide the panel 3 on a circular path around the transverse welding cylinder 21, intermediate support pieces 44 are disposed at the cylinder periphery between the transverse welding ledges 22 and are screwed into the cylinder jacket through circumferentially extending slots 45, shown in FIG. 13, provided in the pieces 44 to enable these intermediate pieces 44 to be positioned for use with other ledge spacings by displacement.

FIGS. 14 to 17 show a modified arrangement in which the double ball latches 29 and 30 are disposed in the transverse welding ledge 22 and the transverse welding cylinder 21 is provided on its outer circumference only with upstanding bolts 27 and 28. This embodiment is less expensive to produce than that shown in FIGS. 10 to 12 since it requires a smaller number of double ball latches and the machining of the transverse welding cylinder is substantially simplified. In this embodiment the necessity for an axially offset distribution of the fastening points for closely adjacent points is also substantially eliminated and would become necessary only if extremely close spacing existed. In addition, overlapping bores in the cylinder are avoided.

In both embodiments, the welding belt 35 is freely suspended under tension across a welding bar 37, between an insulating piece 36 fastened to one end of the transverse welding ledge 22 and an insulating piece 38 fastened to the other end of the welding ledge. The insulation pieces 36 and 38 are held in place by screw bolts 39 and 40, respectively, and at least one of them is maintained under spring pressure in order to hold the welding belt 35 under tension even when it expands while being heated. Welding belt 35 can be of any resistance heating material known in the art.

FIGS. 10 and 12 show that the current leads 41 to the welding bands 35 of the transverse welding ledges 22 end at manually clamped insulated terminals 42 from where they lead to a power supply connector in a fixed mounting not shown in detail. When the ledges are replaced or repositioned, it is thus only necessary to loosen the wing nut 43 and then clamp 41a of current lead 41 can be connected to the other frontal face of the transverse welding cylinder or to another peripheral point of the cylinder, again to a corresponding insulated terminal 42.

FIGS. 14 and 16 show the configuration and arrangement of the welding belt 35 on the transverse welding ledge 22. Above and below the welding belt there are layers 46 and 47 of teflon-impregnated fiber glass, for example, which are clamped tight along the edges of the ledge beneath rails 48 and 49 which are held by screws against the welding bar of ledge 22. Below the welding belt 35 along the welding bar 37 there is an elastically yielding pad 50 of rubber or other suitable material.

It will be understood that the above description of the present invention is susceptible to various modifications, changes and adaptations, and the same are intended to be comprehended within the meaning and range of equivalents of the appended claims.

What is claimed is:

1. A machine for forming two continuous superposed panels of heat sealable material into a series of plastic bags and including a transverse welding cylinder mounted for rotation about an axis perpendicular to the length of the panels, transverse welding ledges mounted on the cylindrical surface of the cylinder to extend parallel to its axis and spaced from one another around the cylinder periphery by a distance equal to the desired bag width, and means for rotating the cylinder and causing the panels to contact, and move with, the ledges around at least part of the cylinder periphery, while heating the ledges to weld the panels together along spaced seams transverse to the length of the panels, the center lines of the seams defining the sides of the resulting bags, wherein the improvement comprises means defining a plurality of ledge attachment locations disposed around the periphery of said cylinder at the cylindrical surface thereof for holding said transverse welding ledges at selected ones of said locations around such periphery, each of said locations comprising means for detachably securing said transverse welding ledges to said cylinder, and the number of said locations exceeding the number of said transverse welding ledges being attached to said cylinder at any time during operation of said machine, thereby to permit the establishment of different uniform spacings of said ledges around said cylinder periphery.

2. An arrangement as defined in claim 1 wherein said securing means are mounted equidistantly from the axis of said cylinder and there are at least two securing means at each of said ledge attachment locations arranged in a line parallel to the cylinder axis and each disposed adjacent a respective end of said cylinder.

3. An arrangement as defined in claim 1 wherein each said welding ledge comprises:
   a welding bar extending along the length of said ledge;
   a support padding of resilient material extending along that longitudinal surface of said bar which faces outwardly from said cylinder when said ledge is mounted thereon;
   a welding belt of resistance heating material extending over said support padding along the length of said ledge; and
   two insulating pieces each mounted on a respective end of said bar and between them holding said welding belt freely suspended under tension, one of said insulating pieces being mounted under spring tension for compensating for the thermal expansion experienced by said belt during use.

4. An arrangement as defined in claim 1 further comprising:
   current leads connected to the ends of each said ledge; and
   a plurality of manually clampable, insulated current terminals mounted on the end faces of said cylinder and uniformly distributed around said faces and positioned to provide a terminal at each end for each ledge mounting location.

5. An arrangement as defined in claim 1 further comprising intermediate panel support pieces mounted on the cylindrical surface of said cylinder between said ledges for supporting said panels, and bolt means connecting said support pieces to said cylinder, said support pieces being provided with elongated slots through which said bolt means passes, and which extend along the circumference of said cylinder for permitting said support pieces to be adjustably positioned.

6. A machine for forming two continuous superposed panels of heat sealable material into a series of plastic bags and including a transverse welding cylinder mounted for rotation about an axis perpendicular to the length of the panels, transverse welding ledges mounted on the cylindrical surface of the cylinder to extend parallel to its axis and spaced from one another around the cylinder periphery by a distance equal to the desired bag width, and means for rotating the cylinder and causing the panels to contact, and move with, the ledges around at least part of the cylinder periphery, while heating the ledges to weld the panels together along spaced seams transverse to the length of the panels, the centerlines of the seams defining the sides of the resulting bags, wherein the improvement comprises longitudinal seam welding means disposed ahead of said transverse cylinder for welding the panels together along one longitudinal edge thereof, said longitudinal seam welding means comprising two spaced longitudinal welding rollers each for producing a continuous weld during each revolution, with the welds produced by each roller being separated by gaps, said panels passing over said rollers along an S-shaped path, and moving together with said rollers, and said rollers being arranged for causing the gaps between the welds produced by one said roller to be positioned between the gaps between the welds produced by the other said roller.

7. An arrangement as defined in claim 6 wherein the diameters of said rollers are related to the diameter of said cylinder, and said rollers are positioned relative to said cylinder, for causing each gap in the welds produced by each said roller to coincide with a respective transverse seam produced by said ledges.

8. An arrangement as defined in claim 7 wherein the diameter of the assembly of said cylinder and ledges is an integral multiple of the diameter of each said roller.

9. A machine for forming two continuous superposed panels of heat sealable material into a series of plastic bags and including a transverse welding cylinder mounted for rotation about an axis perpendicular to the length of the panels, transverse welding ledges mounted on the cylindrical surface of the cylinder to extend parallel to its axis and spaced from one another around the cylinder periphery by a distance equal to the desired bag width, and means for rotating the cylinder and causing the panels to contact, and move with, the ledges around at least part of the cylinder periphery, while heating the ledges to weld the panels together along spaced seams transverse to the length of the panels, the center lines of the seams defining the sides of the resulting bags, wherein the improvement comprises a plurality of ledge attachment elements mounted equidistantly from the axis of said cylinder and around the periphery of the cylindrical surface thereof for detachably holding said transverse welding ledges at selected locations around such periphery, thereby to permit the establishment of different uniform spacings of said ledges around said cylinder periphery, with two attachment elements at each ledge holding location arranged in a line parallel to the cylinder axis and each disposed adjacent a respective end of said cylinder, the distance between two adjacent ledge holding locations being less than the dimension of each said element in the direction of the circumference of said cylinder, said elements at one of said adjacent locations being axially offset relative to said elements at the other of said adjacent locations, and the same spacing exists between elements at each said location, whereby a ledge can be held in one orientation at one said adjacent location and held at the other said adjacent location with its ends reversed relative to the said one orientation.

10. A machine for forming two continuous superposed panels of heat sealable material into a series of plastic bags and including a transverse welding cylinder mounted for rotation about an axis perpendicular to the length of the panels, transverse welding ledges mounted on the cylindrical surface of the cylinder to extend parallel to its axis and spaced from one another around the cylinder periphery by a distance equal to the desired bag width, and means for rotating the cylinder and causing the panels to contact, and move with, the ledges around at least part of the cylinder periphery, while heating the ledges to weld the panels together along spaced seams transverse to the length of the panels, the center lines of the seams defining the sides of the resulting bags, wherein the improvement comprises a plurality of ledge attachment elements disposed around the periphery of said cylinders at the cylindrical surface thereof for detachably holding said transverse welding ledges at selected locations around such periphery, thereby to permit the establishment of different uniform spacings of said ledges around said cylinder periphery, and at least one coupling element on each said ledge detachably connectable to any one of said attachment elements, each of said ledge attachments constituting a first type of element and each said coupling element constituting a second type of element, one said type of element being a plug-in bolt and the other said type of element being a double ball latch for receiving and detachably holding said bolt each said bolt being engageable in each said latch by a relative movement in the direction of a radius of said cylinder.

11. An arrangement as defined in claim 10 wherein that one of said ledges and cylinder which carries said latches is provided with a plurality of bores extending from the ends thereof and parallel to the axis of said cylinder, and each said latch is inserted in a respective bore.

* * * * *